US012350681B2

(12) United States Patent
Norton

(10) Patent No.: US 12,350,681 B2
(45) Date of Patent: Jul. 8, 2025

(54) SYSTEMS AND METHODS FOR ACTIVE WARMING OF A CARTRIDGE

(71) Applicant: ILLUMINA, INC., San Diego, CA (US)

(72) Inventor: Kirkpatrick W. Norton, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 896 days.

(21) Appl. No.: 17/255,780

(22) PCT Filed: Nov. 22, 2019

(86) PCT No.: PCT/US2019/062814
§ 371 (c)(1),
(2) Date: Dec. 23, 2020

(87) PCT Pub. No.: WO2020/112550
PCT Pub. Date: Jun. 4, 2020

(65) Prior Publication Data

US 2021/0129153 A1 May 6, 2021

Related U.S. Application Data

(60) Provisional application No. 62/773,737, filed on Nov. 30, 2018.

(51) Int. Cl.
*B01L 7/00* (2006.01)

(52) U.S. Cl.
CPC ........... *B01L 7/52* (2013.01); *B01L 2200/028* (2013.01); *B01L 2200/16* (2013.01); *B01L 2300/022* (2013.01); *B01L 2300/1827* (2013.01)

(58) Field of Classification Search
CPC .. B01L 7/52; B01L 2200/028; B01L 2200/16; B01L 2300/022; B01L 2300/1827
(Continued)

(56) References Cited

U.S. PATENT DOCUMENTS 6,172,218 B1 1/2001 Brenner
6,440,725 B1 8/2002 Pourahmadi et al.
(Continued)

FOREIGN PATENT DOCUMENTS

CN 101641150 A 2/2010
CN 103571740 A 2/2014
(Continued)

OTHER PUBLICATIONS

International Search Opinion and Written Opinion for PCT/US2019/062814, mailed May 12, 2020.

*Primary Examiner* — Michael L Hobbs
*Assistant Examiner* — Lenora A Abel
(74) *Attorney, Agent, or Firm* — MARSHALL, GERSTEIN & BORUN LLP

(57) ABSTRACT

Described herein are devices, systems, and methods for constructing and utilizing a cartridge having one or more active warming elements. A cartridge can include a housing, an active warming element, and a power source connector. The housing can define a chamber storing a volume of reagent therein. The active warming element can be embedded within the housing and positioned proximate to the chamber. The power source connector can be coupled to the housing and electrically coupled to the active warming element embedded within the housing. The active warming element is to thaw the volume of reagent within the chamber responsive to providing electrical power to the power source connector.

17 Claims, 4 Drawing Sheets

(58) Field of Classification Search
USPC .......................................................... 435/286.1
See application file for complete search history.

(56) References Cited

U.S. PATENT DOCUMENTS

| | | | |
|---|---|---|---|
| 9,879,583 B2 | 1/2018 | Hafner et al. | |
| 10,112,196 B2 | 10/2018 | Andreyev et al. | |
| 2009/0221059 A1* | 9/2009 | Williams | F16K 99/0044 422/400 |
| 2010/0086991 A1 | 4/2010 | Fish | |
| 2012/0115738 A1 | 5/2012 | Zhou et al. | |
| 2014/0011266 A1* | 1/2014 | Webster | B01L 7/52 435/303.1 |
| 2014/0087359 A1 | 3/2014 | Njoroge et al. | |
| 2014/0308661 A1* | 10/2014 | Holmes | G01N 35/0092 435/6.1 |
| 2015/0352553 A1* | 12/2015 | Beer | C12M 41/48 435/286.1 |
| 2016/0047832 A1 | 2/2016 | Gumbrecht et al. | |
| 2016/0129445 A1 | 5/2016 | Corey et al. | |
| 2017/0144155 A1 | 5/2017 | Bohm et al. | |
| 2017/0157613 A1 | 6/2017 | Li et al. | |
| 2018/0071734 A1* | 3/2018 | Andreyev | B01L 3/502715 |
| 2018/0080063 A1* | 3/2018 | Li | B01L 7/52 |

FOREIGN PATENT DOCUMENTS

| | | | |
|---|---|---|---|
| CN | 106076449 | A | 11/2016 |
| CN | 206977730 | U | 2/2018 |
| DE | 19913859 | A1 | 9/2000 |
| EP | 1 180 135 | A2 | 2/2002 |
| EP | 2926076 | A2 | 10/2015 |
| JP | 2006-125868 | A | 5/2006 |
| JP | 2011-039050 | A | 2/2011 |
| JP | 2012-127974 | A | 7/2012 |
| JP | 2016-218074 | A | 12/2016 |
| RU | 2016145904 | A | 6/2018 |
| WO | WO-2005/045399 | A1 | 5/2005 |
| WO | WO-2006/125767 | A1 | 11/2006 |

* cited by examiner

SYSTEMS AND METHODS FOR ACTIVE WARMING OF A CARTRIDGE

CROSS REFERENCE TO RELATED APPLICATION

This application is a 35 U.S.C. § 371 National Stage of International Patent Application No. PCT/US2019/062814, filed Nov. 22, 2019, which itself claims the benefit of and priority to U.S. Provisional Patent Application No. 62/773,737 filed Nov. 30, 2018, the content of each which is incorporated herein in its entirety and for all purposes.

BACKGROUND

Various biochemical protocols involve performing a large number of controlled reactions on support surfaces or within designated reaction chambers. The controlled reactions may be conducted to analyze a biological sample or to prepare the biological sample for subsequent analysis. The analysis may identify or reveal properties of chemicals involved in the reactions. For example, in an array-based, cyclic sequencing assay (e.g., sequencing-by-synthesis (SBS)), a dense array of DNA features (e.g., template nucleic acids) are sequenced through iterative cycles of enzymatic manipulation. After each cycle, an image may be captured and subsequently analyzed with other images to determine a sequence of the DNA features. In another biochemical assay, an unknown analyte having an identifiable label (e.g., fluorescent label) may be exposed to an array of known probes that have predetermined addresses within the array. Observing chemical reactions that occur between the probes and the unknown analyte may help identify or reveal properties of the analyte.

SUMMARY

Described herein are devices, systems, and methods for constructing and utilizing a cartridge having one or more active warming elements. One implementation relates to a cartridge that can include a housing, an active warming element, and a power source connector. The housing can define a chamber storing a volume of reagent therein. The active warming element can be embedded within the housing and positioned proximate to the chamber. The power source connector can be coupled to the housing and electrically coupled to the active warming element embedded within the housing. The active warming element is to thaw the volume of reagent within the chamber responsive to providing electrical power to the power source connector.

In some implementations, the housing defines one or more fins extending into the chamber. In some implementations, at least a portion of the active warming element extends into the one or more fins. In some implementations, the active warming element comprises conductive carbon embedded in the housing. In some implementations, the active warming element comprises a resistive tape embedded in the housing. In some implementations, the chamber is defined by a first sub-component, wherein the housing comprises a plurality of sub-components that are separately constructed and coupled together. In some implementations, the active warming element is coupled to an exterior surface of the first sub-component. In some implementations, the power source connector comprises a conductive sticker having a conductive adhesive. In some implementations, the power source connector comprises a portion of a top sealed to the housing. In some implementations, the top comprises an aluminum foil. In some implementations, the consumable cartridge can include an identifier coupled to the housing. The identifier can comprise an RFID transponder or a barcode.

Another implementation relates to a method that can include coupling a power source connector of a cartridge to a power source and initiating an active heating process to thaw a reagent stored in a chamber of the cartridge. The active heating process can include applying power from the power source to an active warming element embedded in a housing of the cartridge proximate to the chamber storing the reagent for a predetermined period of time.

In some implementations, the predetermined period of time is set responsive to accessing data of an identifier coupled to the housing of the cartridge. The identifier can comprise an RFID transponder or a barcode. In some implementations, the housing of the cartridge can include a second active warming element proximate a second chamber storing a second reagent therein. The active heating process can include applying a second power from the power source to the second active warming element for a second predetermined period of time, where the second predetermined period of time is different than the predetermined period of time.

Yet another implementation relates to a cartridge that can include a housing, an active warming element, and a power source connector. The housing can define a first chamber storing a first volume of a first reagent therein and a second chamber storing a second volume of a second reagent therein. The active warming element can be embedded within the housing and positioned proximate to the first chamber and the second chamber. The power source connector can be coupled to the housing and electrically coupled to the active warming element embedded within the housing. The active warming element is to thaw the first volume of the first reagent within the first chamber to a first target temperature and thaw the second volume of the second reagent within the second chamber to a second target temperature responsive to providing electrical power to the power source connector.

In some implementations, the consumable cartridge can include an RFID transponder embedded in the housing. The first target temperature and the second target temperature can be determined responsive to accessing data of the RFID transponder.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The details of one or more implementations are set forth in the accompanying drawings and the description below. Other features, aspects, and advantages will become apparent from the description, the drawings, and the claims, in which:

Figure 1:
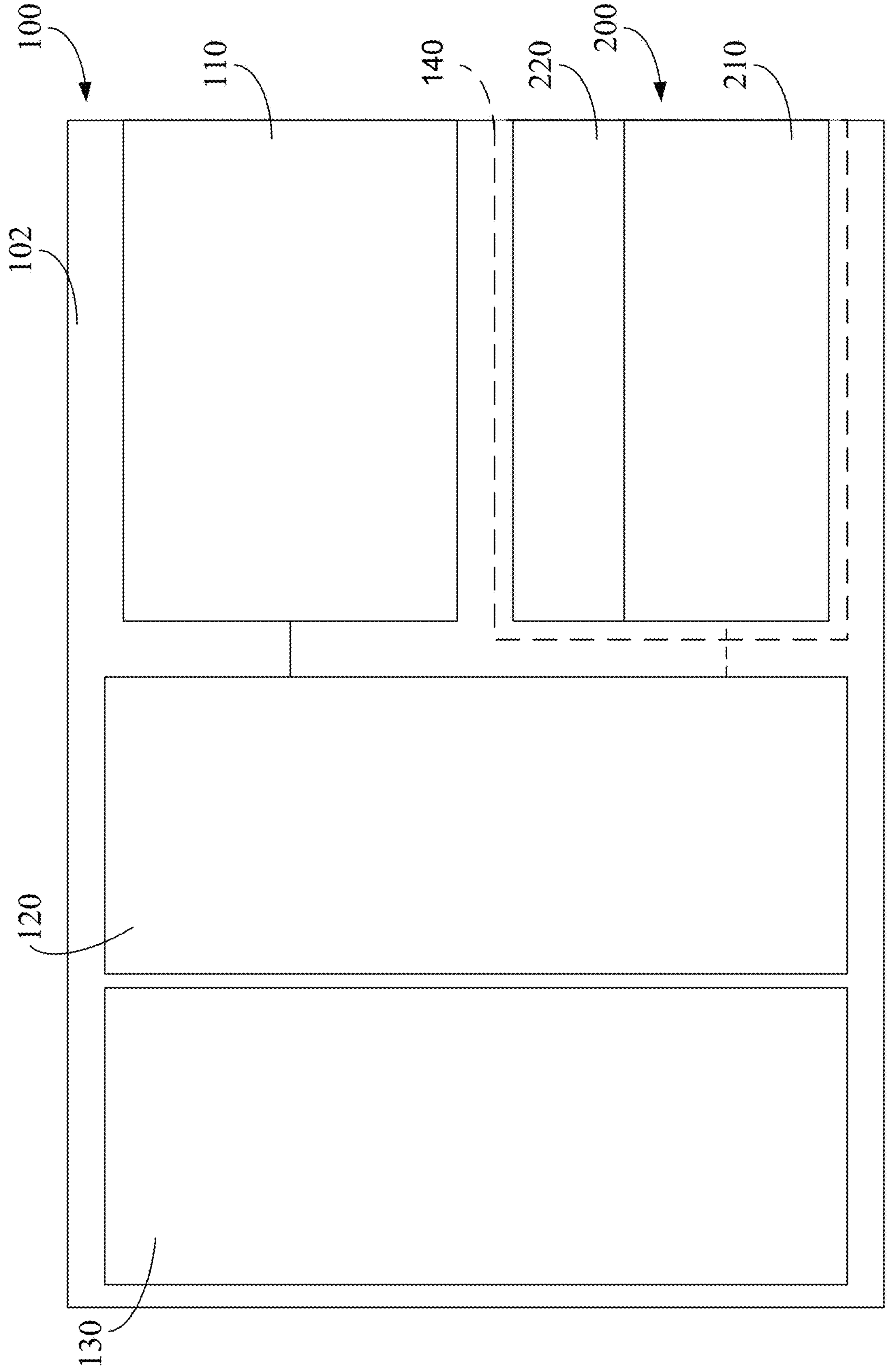
FIG. 1 is a block schematic overview of an example system to conduct at least one of biochemical analysis or sample preparation.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In some aspects, methods and systems are disclosed herein for actively warming a consumable cartridge for a biological or chemical analysis instrument. As used herein, the terms "consumable cartridge," "reagent cartridge," "removeable cartridge," and/or "cartridge" refer to the same cartridge and/or a combination of components making an assembly for a cartridge or cartridge system. As used herein, the term "biochemical analysis" may include at least one of biological analysis or chemical analysis. In some implementations, a consumable cartridge may contain one or more reagents for a genetic sequencing instrument. During transportation and/or storage, the reagents contained within the consumable cartridge may be kept at a low temperature, such as between −10° Celsius and −30° Celsius, such as at −20° Celsius. Storage at such low temperatures can preserve the compounds in the reagents for extended periods of time during transportation and/or prior to usage.

When the reagents are to be used, the cartridge containing the reagents is warmed to a temperature between 0° Celsius and 10° Celsius, such as between 2° Celsius and 8° Celsius, to thaw the reagents therein to be used with the biochemical analysis instrument. Thawing of the reagents can include warming the reagents from a solid or semi-solid frozen state to a liquid state. In some instances, thawing of the reagents can simply include warming the reagents from a low storage temperature, such as between −10° Celsius and −30° Celsius, to an initial operating temperature, such as between 0° Celsius and 10° Celsius. Such warming of the reagents can be accomplished via a water bath (i.e., immersing, partially or completely, the consumable cartridge in water at or above the desired target temperature), exposure in a chiller between 2° Celsius and 8° Celsius, exposure to room temperature (e.g., 19° Celsius to 25° Celsius), exterior mounted heaters, and/or a heating bar inserted into an opening in the consumable cartridge. However, such warming of the reagents to an operating temperature can be a lengthy process (e.g., on the order of an hour to several hours) to sufficiently and substantially uniformly warm the reagents to a target temperature. Attempting to accelerate the warming process, such as by using a higher temperature for the water, air, heaters or heating bar, can result in hot spots or otherwise uneven temperatures on the consumable cartridge. Such uneven temperatures may adversely impact the reagents stored within the consumable cartridge and/or other components coupled to the consumable cartridge.

Described herein is a cartridge having one or more active warming elements integrated into one or more walls or other structural features for heat transfer to reagents stored therein. The one or more active warming elements can include conductive carbon, conductive wires, resistive tape, heating coils, and/or any other elements that can be temperature controlled. The active warming elements can be distributed within the one or more walls or other structural features based on a determined heat transfer rate to a reagent within the consumable cartridge. For instance, the density of conductive carbon, the conductive medium itself, an applied voltage, and/or the resistivity of the active warming elements can be tailored based on a desired target temperature for the reagent within the compartment of the consumable cartridge using the volume of reagent stored therein and the surface area through which the heat transfer is to occur. That is, for a small volume of reagent, a lower density of conductive carbon, a lower resistance conductive medium, a lower applied voltage, and/or lower resistivity for the active warming element can be utilized. For a larger volume of reagent, a higher density of conductive carbon, a higher resistance conductive medium, a higher applied voltage, and/or higher resistivity for the active warming element can be utilized. The active warming elements are controlled to heat the reagent to a desired target temperature. The control can be an open loop active heating where a specific voltage can be applied based on a known or calculated active warming element resistance to deliver a desired amount of power to the active warming element. In other implementations, the control can be a closed loop active heating where a voltage or current can be modified by periodically determining a temperature of the active warming element. A resistance-to-temperature curve or equation can be predetermined or known and used to determine the temperature based on a measured resistance. In other instances, a temperature sensor can be implemented to determine the temperature. In some implementations, sub-walls or fins can be implemented to protrude into the volume in which the reagent is stored to increase the surface area for heat transfer. Thus, both a smaller volume and a larger volume can be heated to achieve a desired target temperature at substantially the same time.

In some implementations, two different volumes can have different start times for warming such that both volumes achieve a corresponding target temperature at substantially the same time. In some implementations, the target temperatures for different volumes can be different target temperatures. That is, one reagent may have an operating temperature of 2° Celsius while another reagent may have an operating temperature of 8° Celsius. Thus, the active warming elements can be configured to achieve the different target temperatures for the different volumes at substantially the same time.

In some implementations, the active warming elements can be embedded and/or otherwise positioned within the consumable cartridge material. For instance, a mesh or other network of conductive carbon can be provided while the material of the consumable cartridge is injected or otherwise constructed with the conductive carbon. In other implementations, conductive wires, resistive tape, heating coils, and/or any other elements can be provided while the material of the consumable cartridge is injected or otherwise constructed about the element.

In other implementations, compartments can be individually formed with the active warming element positioned on an exterior surface thereto and one or more of the compartments can be coupled together to form the completed consumable cartridge or a subassembly thereof. In other implementations, the active warming element can be positioned within a compartment volume and/or on an interior surface. In such an implementation, an insulating material or coating can be applied to the active warming element. Such insulating material can be the compartment material (e.g., a plastic or other polymer). Such an insulation can reduce the likelihood of exposing the reagent within the compartment to an electric current that could electrolyze the reagent therein.

The consumable cartridge can include one or more power source connectors, such as one or more conductive stickers with a conductive adhesive, conductive pads, spring-loaded tabs, and/or other conductive material to electrically couple the one or more active warming elements to a power source. In some implementations, a metallic or otherwise conductive film sealing the reagents within the compartments can be used to electrically couple the one or more active warming elements to a power source. A single power source connector can supply electrical power to all of the active warming elements or each of several power source connectors can supply electrical power to a corresponding active warming element such that the active warming elements can be selectively activated. In some implementations, the power source can be the biochemical analysis instrument or can be a separate device for controlled thawing of the consumable cartridge.

In some implementations, the process to actively heat the consumable cartridge via the active warming elements may simply involve connecting the power connector(s) of the consumable cartridge to a power source such that electrical power is applied to the active warming elements for a predetermined period of time. The one or more active warming elements may be positioned and/or configured within the consumable cartridge to warm the reagents therein at the same or different heat transfer rates such that the reagents each achieve a target temperature at at least substantially the same time.

In other implementations, the active warming elements may be controllable, either by the biochemical analysis instrument or a separate device for controlled thawing of the consumable cartridge. The control of the active warming elements can be predetermined based on a heating algorithm selectable by a user of the instrument or separate device or the heating algorithm may be selectively activated based on an identified of the consumable cartridge. For example, the identifier of the consumable cartridge may be a radio-frequency identification (RFID) transponder, a barcode, an identification chip, and/or other identifier. Responsive to the instrument or other device receiving data based on the identifier, a heating algorithm can be activated to automatically initiate the active warming elements. In some implementations, a first set of one or more active warming elements can be activated at a first time, such as those associated with a large volume compartment, and a second set of one or more active warming elements can be activated at a second time subsequent to the first time. In other implementations, the heating algorithm can apply a first power to the first set of one or more active warming elements and a second power to the second set of one or more active warming elements such that different heating rates are applied to the reagents within the consumable cartridge. In both instances, the heating algorithm warms the reagents within the consumable cartridge such that the reagents stored therein each achieve a target temperature at substantially the same time.

The implementations described herein advantageously provide for configurable and/or controllable active warming or heating of reagents within a consumable cartridge to achieve one or more target temperatures without resulting in warm spots or high temperature zones of the consumable cartridge that could affect reagents stored therein. Such implementations can reduce the thaw time of reagents for biochemical analysis and/or control a target temperature of one or more reagents within a consumable cartridge. Reduction of reagent thaw time can increase the throughput of biochemical analyses for an instrument, such as a genetic sequencing instrument, by reducing downtime waiting for reagent consumables to thaw from a storage temperature to an operational temperature.

Implementations set forth herein may be used to perform designated reactions for consumable cartridge preparation and/or biochemical analysis. FIG. 1 is a schematic diagram of a system 100 that is configured to conduct biochemical analysis. The system 100 can include a base instrument 102 that is configured to receive and separably engage a removable cartridge 200. The base instrument 102 and the removable cartridge 200 may be configured to interact with each other to transport a biological sample to different locations within the system 100 to conduct designated reactions that include the biological sample in order to prepare the biological sample for subsequent analysis, and, optionally, to detect one or more events with the biological sample. In some implementations, the base instrument 102 can be configured to detect one or more events with the biological sample directly on the removable cartridge 200. The events may be indicative of a designated reaction with the biological sample. The removable cartridge 200 may be constructed according to any of the cartridges described herein.

Although the following is with reference to the base instrument 102 and the removable cartridge 200 as shown in FIG. 1, it is understood that the base instrument 102 and the removable cartridge 200 illustrate only one implementation of the system 100 and that other implementations exist. For example, the base instrument 102 and the removable cartridge 200 include various components and features that, collectively, execute several operations for preparing the biological sample and/or analyzing the biological sample. In the illustrated implementation, each of the base instrument 102 and the removable cartridge 200 are capable of performing certain functions. It is understood, however, that the base instrument 102 and the removable cartridge 200 may perform different functions and/or may share such functions. For example, the base instrument 102 is shown to include a detection assembly 110 (e.g., imaging device) that is configured to detect the designated reactions at the removable cartridge 200. In alternative implementations, the removable cartridge 200 may include the detection assembly and may be communicatively coupled to one or more components of the base instrument 102. As another example, the base instrument 102 is a "dry" instrument that does not provide, receive, or exchange liquids with the removable cartridge 200. That is, as shown, the removable cartridge 200 includes a consumable reagent portion 210 and a flow cell portion 220. The consumable reagent portion 210 can contain reagents used during biochemical analysis and the flow cell portion 220 can include an optically transparent region or other detectible region for the detection assembly 110 to perform detection of one or more events occurring within the flow cell portion 220. In alternative implementations, the base instrument 102 may provide, for example, reagents or other liquids to the removable cartridge 200 that are subsequently consumed (e.g., used in designated reactions) by the removable cartridge 200.

As used herein, the biological sample may include one or more biological or chemical substances, such as nucleosides, nucleic acids, polynucleotides, oligonucleotides, proteins, enzymes, polypeptides, antibodies, antigens, ligands, receptors, polysaccharides, carbohydrates, polyphosphates, nanopores, organelles, lipid layers, cells, tissues, organisms, and/or biologically active chemical compound(s), such as analogs or mimetics of the aforementioned species. In some instances, the biological sample may include whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes.

In some implementations, the biological sample may include an added material, such as water, deionized water, saline solutions, acidic solutions, basic solutions, detergent solutions and/or pH buffers. The added material may also include reagents that will be used during the designated assay protocol to conduct the biochemical reactions. For example, added liquids may include material to conduct multiple polymerase-chain-reaction (PCR) cycles with the biological sample.

It should be understood, however, that the biological sample that is analyzed may be in a different form or state than the biological sample loaded into the system 100. For example, the biological sample loaded into the system 100 may include whole blood or saliva that is subsequently treated (e.g., via separation or amplification procedures) to provide prepared nucleic acids. The prepared nucleic acids may then be analyzed (e.g., quantified by PCR or sequenced by SBS) by the system 100. Accordingly, when the term "biological sample" is used while describing a first operation, such as PCR, and used again while describing a subsequent second operation, such as sequencing, it is understood that the biological sample in the second operation may be modified with respect to the biological sample prior to or during the first operation. For example, a sequencing step (e.g. SBS) may be carried out on amplicon nucleic acids that are produced from template nucleic acids that are amplified in a prior amplification step (e.g. PCR). In this case the amplicons are copies of the templates and the amplicons are present in higher quantity compared to the quantity of the templates.

In some implementations, the system 100 may automatically prepare a sample for biochemical analysis based on a substance provided by the user (e.g., whole blood or saliva). However, in other implementations, the system 100 may analyze biological samples that are partially or preliminarily prepared for analysis by the user. For example, the user may provide a solution including nucleic acids that were already isolated and/or amplified from whole blood.

As used herein, a "designated reaction" includes a change in at least one of a chemical, electrical, physical, or optical property (or quality) of an analyte-of-interest. In particular implementations, the designated reaction is an associative binding event (e.g., incorporation of a fluorescently labeled biomolecule with the analyte-of-interest). The designated reaction can be a dissociative binding event (e.g., release of a fluorescently labeled biomolecule from an analyte-of-interest). The designated reaction may be a chemical transformation, chemical change, or chemical interaction. The designated reaction may also be a change in electrical properties. For example, the designated reaction may be a change in ion concentration within a solution. Some reactions include, but are not limited to, chemical reactions such as reduction, oxidation, addition, elimination, rearrangement, esterification, amidation, etherification, cyclization, or substitution; binding interactions in which a first chemical binds to a second chemical; dissociation reactions in which two or more chemicals detach from each other; fluorescence; luminescence; bioluminescence; chemiluminescence; and biological reactions, such as nucleic acid replication, nucleic acid amplification, nucleic acid hybridization, nucleic acid ligation, phosphorylation, enzymatic catalysis, receptor binding, or ligand binding. The designated reaction can also be addition or elimination of a proton, for example, detectable as a change in pH of a surrounding solution or environment. An additional designated reaction can be detecting the flow of ions across a membrane (e.g., natural or synthetic bilayer membrane). For example, as ions flow through a membrane, the current is disrupted, and the disruption can be detected. Field sensing of charged tags can also be used as can thermal sensing and other suitable analytical sensing techniques.

In particular implementations, the designated reaction includes the incorporation of a fluorescently-labeled molecule to an analyte. The analyte may be an oligonucleotide and the fluorescently-labeled molecule may be a nucleotide. The designated reaction may be detected when an excitation light is directed toward the oligonucleotide having the labeled nucleotide, and the fluorophore emits a detectable fluorescent signal. In alternative implementations, the detected fluorescence is a result of chemiluminescence and/or bioluminescence. A designated reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore or decrease fluorescence by co-locating a quencher and fluorophore.

As used herein, a "reaction component" includes any substance that may be used to obtain a designated reaction. For example, reaction components include reagents, catalysts such as enzymes, reactants for the reaction, samples, products of the reaction, other biomolecules, salts, metal cofactors, chelating agents, and buffer solutions (e.g., hydrogenation buffer). The reaction components may be delivered, individually in solutions or combined in one or more mixture, to various locations in a fluidic network. For instance, a reaction component may be delivered to a reaction chamber where the biological sample is immobilized. The reaction components may interact directly or indirectly with the biological sample. In some implementations, the removable cartridge 200 is preloaded with one or more of the reaction components involved in carrying out a designated assay protocol. Preloading can occur at one location (e.g. a manufacturing facility) prior to receipt of the cartridge 200 by a user (e.g. at a customer's facility). For example, the one or more reaction components or reagents can be preloaded into the consumable reagent portion 210. In some implementations, the removable cartridge 200 can also be preloaded with a flow cell in the flow cell portion 220.

In some implementations, the base instrument 102 may be configured to interact with one removable cartridge 200 per session. After the session, the removable cartridge 200 may be replaced with another removable cartridge 200. In other implementations, the base instrument 102 may be configured to interact with more than one removable cartridge 200 per session. As used herein, the term "session" includes performing at least one of sample preparation and/or biochemical analysis protocol. Sample preparation may include separating, isolating, modifying and/or amplifying one or more components of the biological sample so that the prepared biological sample is suitable for analysis. In some implementations, a session may include continuous activity in which a number of controlled reactions are conducted until (a) a designated number of reactions have been conducted, (b) a designated number of events have been detected, (c) a designated period of system time has elapsed, (d) signal-to-noise has dropped to a designated threshold; (e) a target component has been identified; (f) system failure or malfunction has been detected; and/or (g) one or more of the resources for conducting the reactions has depleted. Alternatively, a session may include pausing system activity for a period of time (e.g., minutes, hours, days, weeks) and later completing the session until at least one of (a)-(g) occurs.

An assay protocol may include a sequence of operations for conducting the designated reactions, detecting the designated reactions, and/or analyzing the designated reactions. Collectively, the removable cartridge 200 and the base instrument 102 may include the components for executing the different operations. The operations of an assay protocol may include fluidic operations, thermal-control operations, detection operations, and/or mechanical operations. A fluidic operation includes controlling the flow of fluid (e.g., liquid or gas) through the system 100, which may be actuated by the base instrument 102 and/or by the removable cartridge 200. For example, a fluidic operation may include controlling a pump to induce flow of the biological sample or a reaction component into a reaction chamber. A thermal-control operation may include controlling a temperature of a designated portion of the system 100, such as one or more portions of the removable cartridge 200. By way of example, a thermal-control operation may include raising or lowering a temperature of a polymerase chain reaction (PCR) zone where a liquid that includes the biological sample is stored. A detection operation may include controlling activation of a detector or monitoring activity of the detector to detect predetermined properties, qualities, or characteristics of the biological sample. As one example, the detection operation may include capturing images of a designated area that includes the biological sample to detect fluorescent emissions from the designated area. The detection operation may include controlling a light source to illuminate the biological sample or controlling a detector to observe the biological sample. A mechanical operation may include controlling a movement or position of a designated component. For example, a mechanical operation may include controlling a motor to move a valve-control component in the base instrument 102 that operably engages a movable valve in the removable cartridge 200. In some cases, a combination of different operations may occur concurrently. For example, the detector may capture images of the reaction chamber as the pump controls the flow of fluid through the reaction chamber. In some cases, different operations directed toward different biological samples may occur concurrently. For instance, a first biological sample may be undergoing amplification (e.g., PCR) while a second biological sample may be undergoing detection.

Similar or identical fluidic elements (e.g., channels, ports, reservoirs, etc.) may be labeled differently to more readily distinguish the fluidic elements. For example, ports may be referred to as reservoir ports, supply ports, network ports, feed port, etc. It is understood that two or more fluidic elements that are labeled differently (e.g., reservoir channel, sample channel, flow channel, bridge channel) do not require that the fluidic elements be structurally different. Moreover, the claims may be amended to add such labels to more readily distinguish such fluidic elements in the claims.

A "liquid," as used herein, is a substance that is relatively incompressible and has a capacity to flow and to conform to a shape of a container or a channel that holds the substance. A liquid may be aqueous-based and include polar molecules exhibiting surface tension that holds the liquid together. A liquid may also include non-polar molecules, such as in an oil-based or non-aqueous substance. It is understood that references to a liquid in the present application may include a liquid comprising the combination of two or more liquids. For example, separate reagent solutions may be later combined to conduct designated reactions.

The removable cartridge 200 is configured to separably engage or removably couple to the base instrument 102 at a cartridge chamber 140. As used herein, when the terms "separably engaged" or "removably coupled" (or the like) are used to describe a relationship between a removable cartridge 200 and a base instrument 102, the term is intended to mean that a connection between the removable cartridge 200 and the base instrument 102 are readily separable without destroying the base instrument 102. Accordingly, the removable cartridge 200 may be separably engaged to the base instrument 102 in an electrical manner such that the electrical contacts of the base instrument 102 are not destroyed. The removable cartridge 200 may be separably engaged to the base instrument 102 in a mechanical manner such that features of the base instrument 102 that hold the removable cartridge 200, such as the cartridge chamber 140, are not destroyed. The removable cartridge 200 may be separably engaged to the base instrument 102 in a fluidic manner such that the ports of the base instrument 102 are not destroyed. The base instrument 102 is not considered to be "destroyed," for example, if only a simple adjustment to the component (e.g., realigning) or a simple replacement (e.g., replacing a nozzle) is required. Components (e.g., the removable cartridge 200 and the base instrument 102) may be readily separable when the components can be separated from each other without undue effort or a significant amount of time spent in separating the components. In some implementations, the removable cartridge 200 and the base instrument 102 may be readily separable without destroying either the removable cartridge 200 or the base instrument 102.

In some implementations, the removable cartridge 200 may be permanently modified or partially damaged during a session with the base instrument 102. For instance, containers holding liquids may include foil covers that are pierced to permit the liquid to flow through the system 100. In such implementations, the foil covers may be damaged such that the damaged container is to be replaced with another container. In particular implementations, the removable cartridge 200 is a disposable cartridge such that the removable cartridge 200 may be replaced and optionally disposed after a single use.

In other implementations, the removable cartridge 200 may be used for more than one session while engaged with the base instrument 102 and/or may be removed from the base instrument 102, reloaded with reagents, and re-engaged to the base instrument 102 to conduct additional designated reactions. Accordingly, the removable cartridge 200 may be refurbished in some cases such that the same removable cartridge 200 may be used with different consumables (e.g., reaction components and biological samples). Refurbishing can be carried out at a manufacturing facility after the cartridge 200 has been removed from a base instrument 102 located at a customer's facility.

The cartridge chamber 140 can include a slot, mount, connector interface, and/or any other feature to receive the removable cartridge 200 or a portion thereof to interact with the base instrument 102.

The removable cartridge 200 can include a fluidic network that may hold and direct fluids (e.g., liquids or gases) therethrough. The fluidic network can include a plurality of interconnected fluidic elements that are capable of storing a fluid and/or permitting a fluid to flow therethrough. Non-limiting examples of fluidic elements include channels, ports of the channels, cavities, storage modules, reservoirs of the storage modules, reaction chambers, waste reservoirs, detection chambers, multipurpose chambers for reaction and detection, and the like. For example, the consumable reagent portion 210 can include one or more reagent wells or chambers storing reagents and can be part of or coupled to the fluidic network. The fluidic elements may be fluidically coupled to one another in a designated manner so that the system 100 is capable of performing sample preparation and/or analysis.

As used herein, the term "fluidically coupled" (or like term) refers to two spatial regions being connected together such that a liquid or gas may be directed between the two spatial regions. In some cases, the fluidic coupling permits a fluid to be directed back and forth between the two spatial regions. In other cases, the fluidic coupling is uni-directional such that there is only one direction of flow between the two spatial regions. For example, an assay reservoir may be fluidically coupled with a channel such that a liquid may be transported into the channel from the assay reservoir. However, in some implementations, it may not be possible to direct the fluid in the channel back to the assay reservoir. In particular implementations, the fluidic network is configured to receive a biological sample and direct the biological sample through sample preparation and/or sample analysis. The fluidic network may direct the biological sample and other reaction components to a waste reservoir.

One or more implementations may include retaining the biological sample (e.g., template nucleic acid) at a designated location where the biological sample is analyzed. As used herein, the term "retained," when used with respect to a biological sample, includes substantially attaching the biological sample to a surface or confining the biological sample within a designated space. As used herein, the term "immobilized," when used with respect to a biological sample, includes substantially attaching the biological sample to a surface in or on a solid support. Immobilization may include attaching the biological sample at a molecular level to the surface. For example, a biological sample may be immobilized to a surface of a substrate using adsorption techniques including non-covalent interactions (e.g., electrostatic forces, van der Waals, and dehydration of hydrophobic interfaces) and covalent binding techniques where functional groups or linkers facilitate attaching the biological sample to the surface. Immobilizing a biological sample to a surface of a substrate may be based upon the properties of the surface of the substrate, the liquid medium carrying the biological sample, and the properties of the biological sample itself. In some cases, a substrate surface may be functionalized (e.g., chemically or physically modified) to facilitate immobilizing the biological sample to the substrate surface. The substrate surface may be first modified to have functional groups bound to the surface. The functional groups may then bind to the biological sample to immobilize the biological sample thereon. In some cases, a biological sample can be immobilized to a surface via a gel.

In some implementations, nucleic acids can be immobilized to a surface and amplified using bridge amplification. Another useful method for amplifying nucleic acids on a surface is rolling circle amplification (RCA), for example, using methods set forth in further detail below. In some implementations, the nucleic acids can be attached to a surface and amplified using one or more primer pairs. For example, one of the primers can be in solution and the other primer can be immobilized on the surface (e.g., 5'-attached). By way of example, a nucleic acid molecule can hybridize to one of the primers on the surface followed by extension of the immobilized primer to produce a first copy of the nucleic acid. The primer in solution then hybridizes to the first copy of the nucleic acid which can be extended using the first copy of the nucleic acid as a template. Optionally, after the first copy of the nucleic acid is produced, the original nucleic acid molecule can hybridize to a second immobilized primer on the surface and can be extended at the same time or after the primer in solution is extended. In any implementation, repeated rounds of extension (e.g., amplification) using the immobilized primer and primer in solution provide multiple copies of the nucleic acid. In some implementations, the biological sample may be confined within a predetermined space with reaction components that are configured to be used during amplification of the biological sample (e.g., PCR).

One or more implementations set forth herein may be configured to execute an assay protocol that is or includes an amplification (or PCR) protocol. During the amplification protocol, a temperature of the biological sample within a reservoir or channel may be changed in order to amplify the biological sample (e.g., DNA of the biological sample). By way of example, the biological sample may experience (1) a pre-heating stage of about 95° C. for about 75 seconds; (2) a denaturing stage of about 95° C. for about 15 seconds; (3) an annealing-extension stage of about of about 59° C. for about 45 seconds; and (4) a temperature holding stage of about 72° C. for about 60 seconds. Implementations may execute multiple amplification cycles. It is noted that the above cycle describes only one particular implementation and that alternative implementations may include modifications to the amplification protocol.

The methods and systems set forth herein can use arrays having features at any of a variety of densities including, for example, at least about 10 features/$cm^2$, about 100 features/$cm^2$, about 500 features/$cm^2$, about 1,000 features/$cm^2$, about 5,000 features/$cm^2$, about 10,000 features/$cm^2$, about 50,000 features/$cm^2$, about 100,000 features/$cm^2$, about 1,000,000 features/$cm^2$, about 5,000,000 features/$cm^2$, or higher. The methods and apparatus set forth herein can include detection components or devices having a resolution that is at least sufficient to resolve individual features at one or more of these densities.

The base instrument 102 may include a user interface 130 that is configured to receive user inputs for conducting a designated assay protocol and/or configured to communicate information to the user regarding the assay. The user interface 130 may be incorporated with the base instrument 102. For example, the user interface 130 may include a touchscreen that is attached to a housing of the base instrument 102 and configured to identify a touch from the user and a location of the touch relative to information displayed on the touchscreen. Alternatively, the user interface 130 may be located remotely with respect to the base instrument 102.

The base instrument 102 may also include a system controller 120 that is configured to control operation of at least one of the removable cartridge 200 and/or the detection assembly 110. The system controller 120 can be implemented utilizing any combination of dedicated hardware circuitry, boards, DSPs, processors, etc. Alternatively, the system controller 120 may be implemented utilizing an off-the-shelf PC with a single processor or multiple processors, with the functional operations distributed between the processors. As a further option, the system controller 120 may be implemented utilizing a hybrid configuration in which certain modular functions are performed utilizing dedicated hardware, while the remaining modular functions are performed utilizing an off-the-shelf PC and the like.

The system controller 120 may include a plurality of circuitry modules that are configured to control operation of certain components of the base instrument 102 and/or the removable cartridge 200. For instance, the circuitry modules may include a flow-control module that is configured to control flow of fluids through the fluidic network of the removable cartridge 200. The flow-control module may be operably coupled to valve actuators and/or s system pump. The flow-control module may selectively activate the valve actuators and/or the system pump to induce flow of fluid through one or more paths and/or to block flow of fluid through one or more paths.

The system controller 120 may also include a thermal-control module. The thermal-control module may control a thermocycler or other thermal component to provide and/or remove thermal energy from a sample-preparation region of the removable cartridge 200. In one particular example, a thermocycler may increase and/or decrease a temperature that is experienced by the biological sample in accordance with a PCR protocol.

The system controller 120 may also include a detection module that is configured to control the detection assembly 110 to obtain data regarding the biological sample. The detection module may control operation of the detection assembly 110 either through a direct wired connection or through the contact array if the detection assembly 110 is part of the removable cartridge 200. The detection module may control the detection assembly 110 to obtain data at predetermined times or for predetermined time periods. By way of example, the detection module may control the detection assembly 110 to capture an image of a reaction chamber of the flow cell portion 220 of the removable cartridge when the biological sample has a fluorophore attached thereto. In some implementations, a plurality of images may be obtained.

Optionally, the system controller 120 includes an analysis module that is configured to analyze the data to provide at least partial results to a user of the system 100. For example, the analysis module may analyze the imaging data provided by the detection assembly 110. The analysis may include identifying a sequence of nucleic acids of the biological sample.

The system controller 120 and/or the circuitry modules described above may include one or more logic-based devices, including one or more microcontrollers, processors, reduced instruction set computers (RISC), application specific integrated circuits (ASICs), field programmable gate array (FPGAs), logic circuits, and any other circuitry capable of executing functions described herein. In an implementation, the system controller 120 and/or the circuitry modules execute a set of instructions that are stored in a computer- or machine-readable medium therein in order to perform one or more assay protocols and/or other operations. The set of instructions can be stored in the form of information sources or physical memory elements within the base instrument 102 and/or the removable cartridge 200. The protocols performed by the system 100 may be to carry out, for example, quantitative analysis of DNA or RNA, protein analysis, DNA sequencing (e.g., sequencing-by-synthesis (SBS)), sample preparation, and/or preparation of fragment libraries for sequencing.

The set of instructions may include various commands that instruct the system 100 to perform specific operations such as the methods and processes of the various implementations described herein. The set of instructions may be in the form of a software program. As used herein, the terms "software" and "firmware" are interchangeable and include any computer program stored in memory for execution by a computer, including RAM memory, ROM memory, EPROM memory, EEPROM memory, and non-volatile RAM (NVRAM) memory. The above memory types are only examples and are thus not limiting as to the types of memory usable for storage of a computer program.

The software may be in various forms such as system software or application software. Further, the software may be in the form of a collection of separate programs, or a program module within a larger program or a portion of a program module. The software also may include modular programming in the form of object-oriented programming. After obtaining the detection data, the detection data may be automatically processed by the system 100, processed in response to user inputs, or processed in response to a request made by another processing machine (e.g., a remote request through a communication link).

The system controller 120 may be connected to the other components or sub-systems of the system 100 via communication links, which may be hardwired or wireless. The system controller 120 may also be communicatively connected to off-site systems or servers. The system controller 120 may receive user inputs or commands, from a user interface 130. The user interface 130 may include a keyboard, mouse, a touch-screen panel, and/or a voice recognition system, and the like.

The system controller 120 may serve to provide processing capabilities, such as storing, interpreting, and/or executing software instructions, as well as controlling the overall operation of the system 100. The system controller 120 may be configured and programmed to control data and/or power aspects of the various components. Although the system controller 120 is represented as a single structure in FIG. 1, it is understood that the system controller 120 may include multiple separate components (e.g., processors) that are distributed throughout the system 100 at different locations. In some implementations, one or more components may be integrated with the base instrument 102 and one or more components may be located remotely with respect to the base instrument 102.

Figure 2:
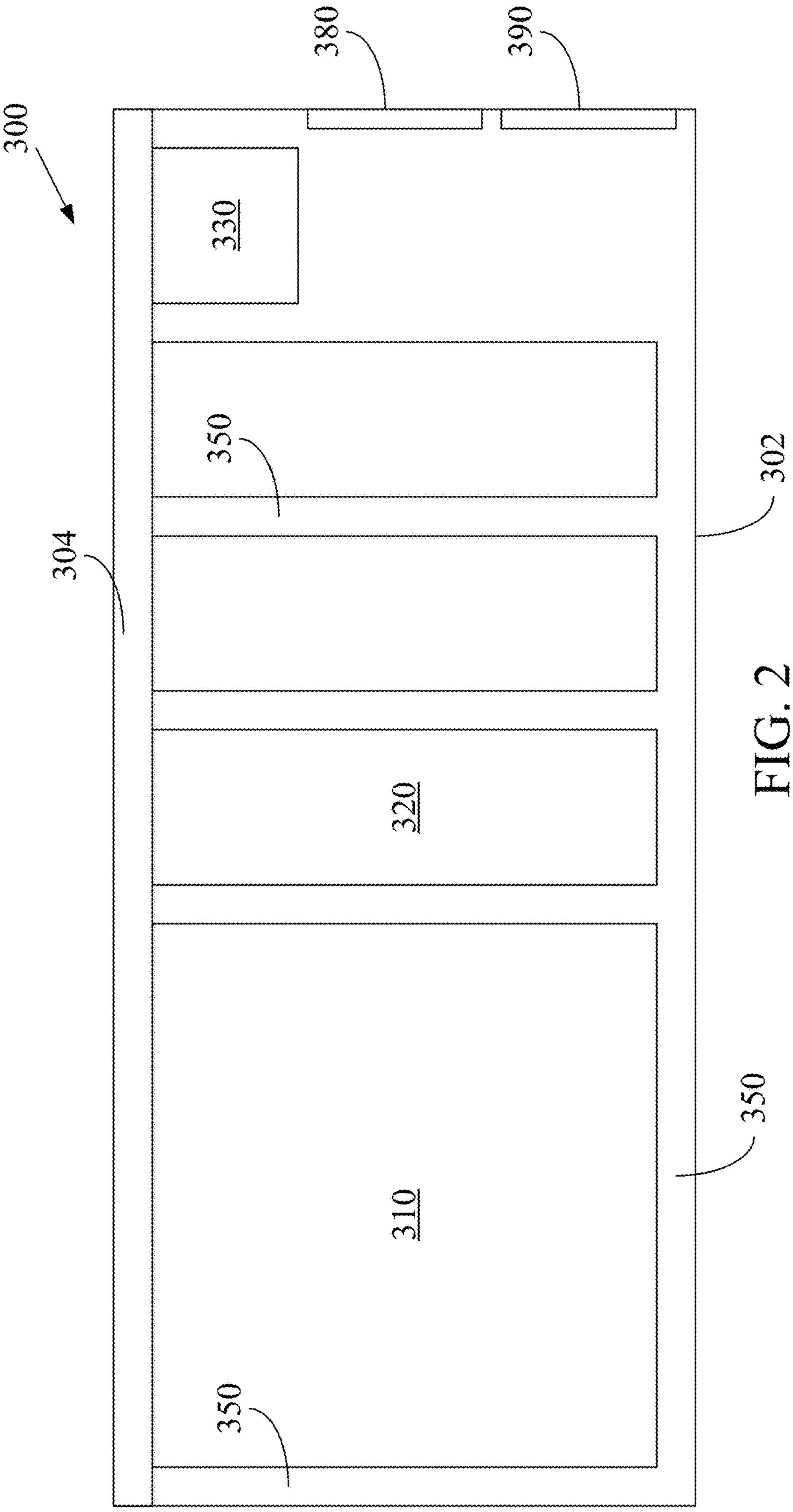
FIG. 2 is a block schematic cross-section of an example consumable cartridge that can be implemented as part of a removable cartridge of FIG. 1.

FIG. 2 depicts an implementation of a consumable cartridge 300. The consumable cartridge can be part of a combined removable cartridge, such as consumable reagent portion 210 of removable cartridge 200 of FIG. 1, or can be a separate reagent cartridge. The consumable cartridge 300 includes a housing 302 and a top 304. The housing 302 can comprise a non-conductive polymer or other material and be formed to make one or more reagent chambers 310, 320, 330. The reagent chambers 310, 320, 330 can be varying in size to accommodate varying volumes of reagents to be stored therein. For instance, a first chamber 310 can be larger than a second chamber 320, and the second chamber 320 can be larger than a third chamber 330. The first chamber 310 is sized to accommodate a larger volume of a particular reagent, such as a buffer reagent. The second chamber 320 is sized to accommodate a smaller volume of reagent than the first chamber 310, such as a reagent chamber holding a cleaving reagent. The third chamber 330 is sized to accommodate an even smaller volume of reagent than the first chamber 310 and the second chamber 320, such as a reagent chamber holding a ffN containing reagent.

In the illustrated implementation, the housing 302 has a plurality of housing walls or sides 350 forming the chambers 310, 320, 330 therein. In the illustrated implementation, the housing 302 forms an at least substantially unitary structure. In alternative implementations, the housing 302 may be constructed by one or more sub-components that are combined to form the housing 302, such as independently formed compartments for chambers 310, 320, and 330.

The housing 302 can be sealed by the top 304 once reagents are provided into the respective chambers 310, 320, 330. The top 304 can comprise a conductive or non-conductive material. For instance, the top 304 can be an aluminum foil seal that is adhesively coupled to top surfaces of the housing 302 to seal the reagents within their respective chambers 310, 320, 330. In other implementations, the top 304 can be a plastic seal that is adhesively coupled to top surfaces of the housing 302 to seal the reagents within their respective chambers 310, 320, 330.

In some implementations, the housing 302 can also include one or more power source connectors 380. The one or more power source connectors 380 are configured to electrically couple a power source to one or more elements of the housing 302, as will be described in greater detail below. The one or more power source connectors 380 can be conductive stickers with a conductive adhesive, conductive pads, spring-loaded tabs, and/or other conductive material to electrically couple one or more elements of the housing 302, such as one or more active warming elements 400 shown in FIG. 4, to a power source.

In some implementations, the housing 302 also includes an identifier 390. The identifier 390 may be a radio-frequency identification (RFID) transponder, a barcode, an identification chip, and/or other identifier. In some implementations, the identifier 390 can be embedded in the housing 302 or attached to an exterior surface. The identifier 390 can include data for a unique identifier for the consumable cartridge 300 and/or data for a type of the consumable cartridge 300. The data of the identifier 390 can be read by the base instrument 102 or a separate device configured for warming the consumable cartridge 300, as will be described in greater detail herein.

Figure 3:
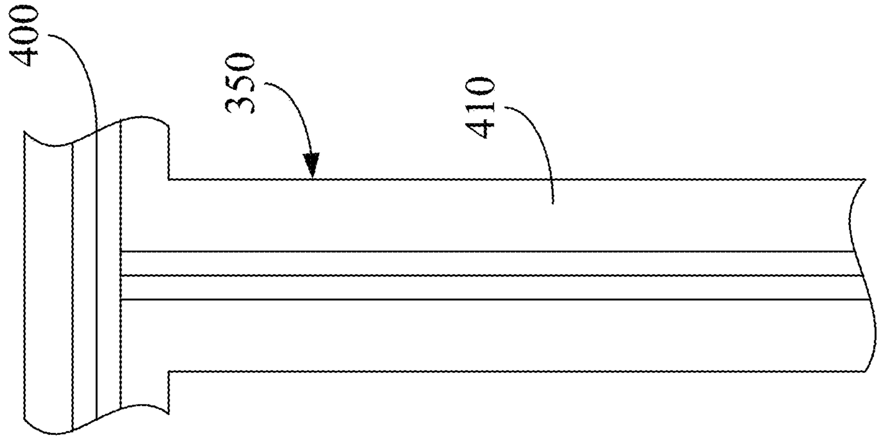
FIG. 3 is a partial cross-section of an example construction of a wall of the consumable cartridge of FIG. 2 showing an embedded active warming element.

FIG. 3 depicts a partial cross-section of an example construction of a wall 350 of the consumable cartridge 300 of FIG. 2 showing an embedded active warming element 400. All or a portion of the consumable cartridge 300 can be constructed with an embedded active warming element 400, such as an electrically conductive material, disposed therein. The active warming element 400 is configured to thaw a volume of a reagent within a chamber 310, 320, 330 of the consumable cartridge 300 responsive to providing electrical power to the one or more power source connectors 380. The active warming element 400 can include conductive carbon, conductive wires, resistive tape, heating coils, and/or any other elements that can be temperature controlled. In some implementations, several active warming elements 400 can be embedded in one or more walls 350 of the consumable cartridge 300. In some instances, one or more active warming elements 400 can be provided in one portion of the consumable cartridge 300, such as one or more active warming elements 400 for chamber 310, that are selectively operated independent of one or more other active warming elements 400, such as one or more active warming elements 400 for chamber 320, such that each chamber 310, 320 can be separately controlled and warmed.

For active warming elements 400 such as resistive heating elements, electrical current may be passed through the active warming elements 400 of the consumable cartridge 300, allowing the consumable cartridge 300 to be heated from within using the active warming elements 400 that are in direct contact with or at least near the reagent(s) stored in chambers therein. In some implementations, the active warming elements 400 can be in both internal walls 350 and external walls 350. In one implementation, the entire consumable cartridge 300 can comprise a plastic containing conductive carbon to make the entirety of the consumable cartridge 300 electrically conductive. Electrical current is then passed through the conductive carbon regions to warm the reagents from within the consumable cartridge 300. This enables thawing to occur more rapidly than simply applying heat (e.g., from an external heater, a water bath, or air temperature) from the outside of the consumable cartridge 300 only.

In an electrically controlled active warming element 400 configuration, the heating current paths can be selected based on which materials are conductive, or, in the case where the entire consumable cartridge 300 is made of conductive material, the heating paths can be controlled based on a position of the power source connectors 380 of the consumable cartridge 300.

In some implementations, insulating layers 410, such as a non-conductive material of the wall 350 or a separate coating, laminate, etc. can be provided to electrically isolate the active warming elements 400 from the reagents stored within a chamber. For instance, if the entirety of the consumable cartridge 300 comprises an electrically conductive material, such as conductive carbon, then a separate coating or laminate can be applied to the interior of the wall 350 for a chamber to isolate the reagent from harmful voltages to prevent or at least substantially reduce the likelihood of electrolyzing the reagents. In some implementations, the insulating layers 410 can include thermal insulation, either in addition or in lieu of the non-conductive material. The thermal insulation can be used to separate reagents from the active warming elements 400 inside the consumable cartridge 300 during thawing. This may allow higher temperatures to be used to achieve shorter thaw times without damaging the reagents.

For active warming elements 400 that are resistive heaters, the resistance of the materials can be selected so that an adequate amount of heat could be generated to warm reagents within corresponding chambers 310, 320, 330 without exposing the reagents to excessive heat or damaging voltages. For instance, voltages below 10 millivolts may be too low to cause any adverse electrochemical reactions for a reagent, so the active warming elements 400 can be designed to have an appropriate resistance so that that warming current passing through the active warming elements 400 does not generate a voltage drop above 10 mV.

Figure 4:
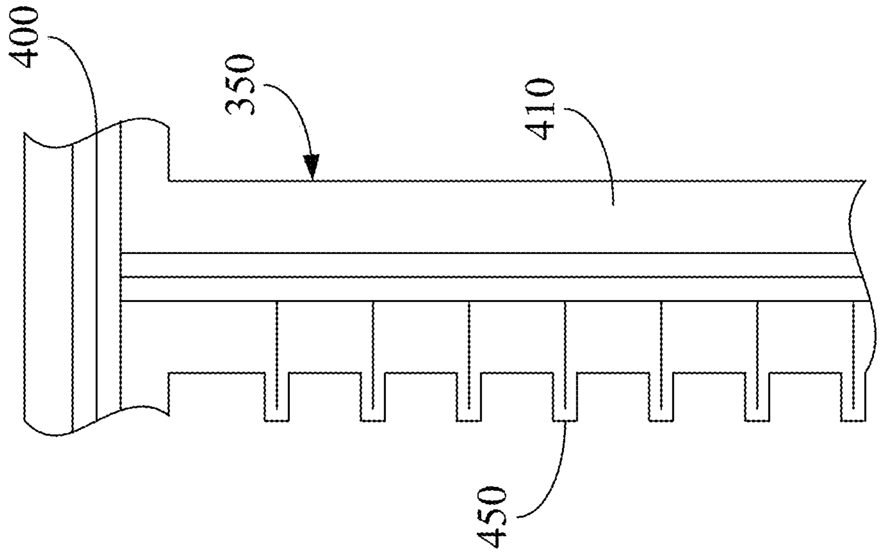
FIG. 4 is a partial cross-section of an example construction of a wall of the consumable cartridge of FIG. 2 showing an embedded active warming element having one or more fins or sub-walls.

Referring to FIG. 4, in some implementations, one or more walls 350 of the consumable cartridge 300 can include one or more fins or sub-walls 450 extending into a portion of the volume of a chamber, such as chamber 310, 320, 330. The one or more fins or sub-walls 450 can include an active warming element 400 or a portion thereof extending into the one or more fins or sub-walls 450 to heat the one or more fins or sub-walls 450. The one or more fins or sub-walls 450 increase the exposed surface area of the wall 350 to the reagent contained in the chamber 310, 320, 330. The increased exposed surface area, when heated by an active warming element 400, can increase the rate at which heat transfer to the frozen reagent occurs, thereby decreasing the time to thaw a reagent in the chamber to a target temperature. In some implementations, the one or more fins or sub-walls 450 can be in a first chamber, such as the larger chamber 310, while other chambers, such as chamber 320, 330, do not have one or more fins or sub-walls 450.

Figure 5:
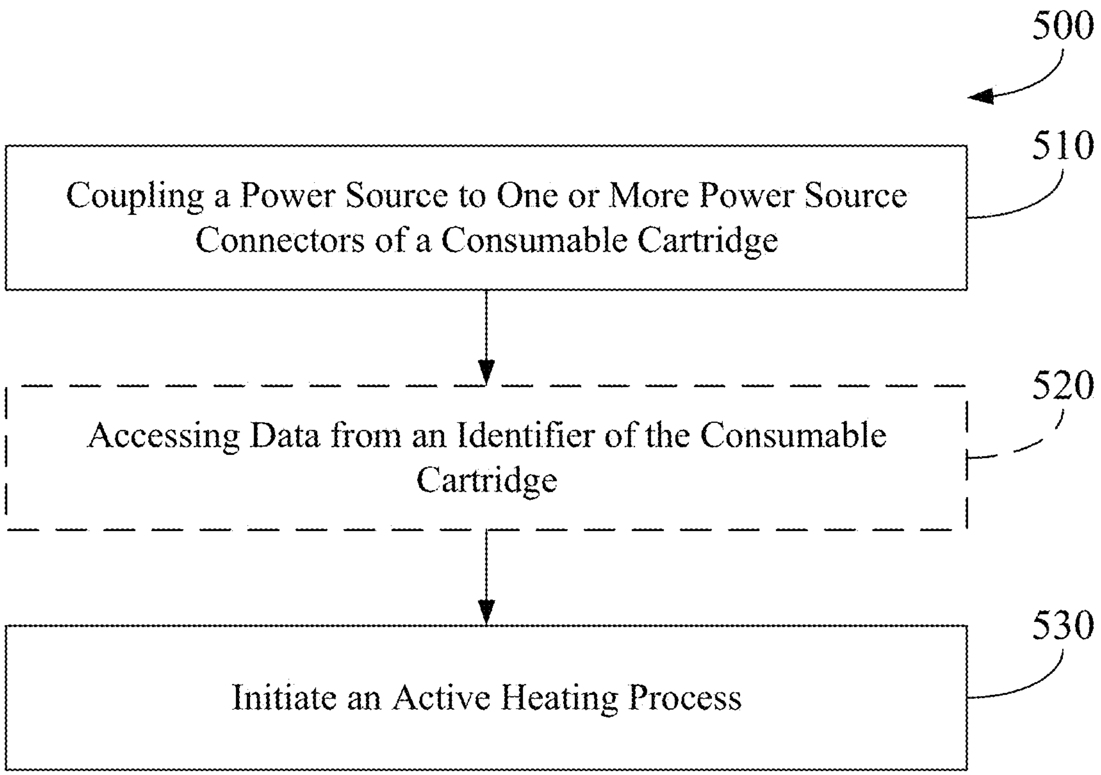
FIG. 5 is a process diagram depicting an example process for active heating of a consumable cartridge.

FIG. 5 depicts a process 500 for thawing reagents stored in a consumable cartridge, such as consumable cartridge 300, using active warming elements, such as active warming elements 400. The process 500 includes coupling a power source to one or more power source connectors of the consumable cartridge (block 510). In some implementations, the one or more power source connectors can be one or more conductive stickers with a conductive adhesive, one or more conductive pads, one or more spring-loaded tabs, and/or other conductive material to electrically couple the one or more active warming elements to a power source. In other implementations, the one or more power source connectors can include a conductive top or lid of the consumable cartridge or a conductive portion thereof. Coupling the power source to the one or more power source connectors can be responsive to inserting or connecting the consumable cartridge to a base instrument, such as base instrument 102. In other implementations, a separate device, such as a cartridge thaw system, can include a power source that is electrically coupled to the one or more power source connectors of the consumable cartridge.

In some implementations, the process 500 can optionally include accessing data from an identifier of the consumable cartridge (block 520). The identifier may be a radio-frequency identification (RFID) transponder, a barcode, an identification chip, and/or other identifier. In some implementations, the identifier can be embedded in a housing of the consumable cartridge or attached to an exterior surface. The identifier can include data for a unique identifier for the consumable cartridge and/or data for a type of the consumable cartridge. In some implementations, accessing data from the identifier may include reading the RFID transponder using an RFID reader. In some implementations, accessing data from the identifier may include reading the barcode using a barcode reader. In some implementations, accessing data from the identifier may include electrically or communicatively interfacing with an identification chip using one or more connectors. In some implementations, the system controller 120 of a base instrument 102 receives the accessed data. In other implementations, the separate device, such as a cartridge thaw system, can receive the accessed data. In some implementations, the identifier can be a physical geometry or dimension of the consumable cartridge that can be determined by the base instrument 102 and/or the separate device, such as a cartridge thaw system.

The process 500 includes initiating an active heating process (block 530). The active heating process includes applying power from a power source to an active warming element embedded in a housing of the consumable cartridge proximate to a chamber storing a reagent for a predetermined period of time.

In some implementations, such as those without accessing data from the identifier, initiating the active heating process can be a predetermined or user set process at the base instrument 102 or at the separate device, such as a cartridge thaw system. That is, the active heating process may include one or more preset input power voltages and/or currents that are applied for one or more predetermined periods of time. For instance, the predetermined active heating process may apply the preset power voltage and/or current for a period of one hour to thaw the reagent. In other implementations, the predetermined heating process may increase or decrease the voltage and/or current over time. In still other implementations, the predetermined heating process can apply a first preset power voltage and/or current for a first period of time and a second preset power voltage and/or current for a second period of time. In some implementations, the one or more preset input powers, currents, and/or periods of time may be defined by a user via a user interface, such as a touchscreen or keyboard communicatively coupled to the base instrument 102 or the separate device, such as a cartridge thaw system.

In implementations where data from an identifier is accessed, an active heating process may be selected responsive to the accessed data. For instance, if an RFID transponder is read by an RFID reader of the base instrument 102 or the separate device, such as a cartridge thaw system, then a corresponding preset active heating process can be selected based on the accessed data. The corresponding preset active heating process can include one or more preset input power voltages and/or currents that are applied for one or more predetermined periods of time. For instance, for a first consumable cartridge having an identifier with first data corresponding to a first type of consumable cartridge, the base instrument 102 or the separate device, such as a cartridge thaw system, can access the first data of the identifier and select a first preset active heating process that applies a first power voltage and/or current for a first predetermined period of time to thaw reagents stored within the first consumable cartridge. When a second consumable cartridge is provided having an identifier with second data corresponding to a second type of consumable cartridge, the base instrument 102 or the separate device, such as a cartridge thaw system, can access the second data of the identifier and select a second preset active heating process that applies a second power voltage and/or current for a second predetermined period of time to thaw reagents stored within the second consumable cartridge, which may be different than the first preset active heating process. In some implementations, sequences of applied voltages and/or currents can be applied for one or more periods of time for the preset active heating processes.

The application of voltages and/or currents can be provided by the one or more power source connectors of the consumable cartridge such that the applied power is transmitted to the one or more active warming elements of the consumable cartridge. The active warming elements increase in temperature, thereby transferring heat to thaw reagents stored within the chambers of the consumable cartridge. The application of voltages and/or currents can be part of an open loop active heating or closed loop active heating process. Open loop active heating can include applying a specific voltage or current based on a known or calculated active warming element resistance to deliver a desired amount of power to the active warming element. Closed loop active heating can include controlling a voltage or current based on periodically determining a temperature of the active warming element (i.e., feedback control). A resistance-to-temperature curve or equation can be predetermined or known and used to determine the temperature based on a measured resistance of the active warming element. In other instances, a temperature sensor can be implemented to determine the temperature of the active warming element. Based on the determined temperature, the voltage and/or current applied can be modified to achieve a desired target temperature.

In some implementations, a first active warming element can be associated with a first heating path and a second active warming element can be associated with a second heating path. For instance, a first active warming element can be embedded in the walls of a first chamber of the consumable cartridge and a second active warming element can be embedded in the walls of a second chamber of the consumable cartridge. The first active warming element can be electrically coupled to a first power source connector and the second active warming element can be electrically connected to a second power source connector. The active heating process can supply power to the first power source connector to thaw reagent in the first chamber at a first time and supply power to the second power source connector to thaw reagent in the second chamber at a second time. That is, the active heating process can control an amount of Joule heating in different regions of the consumable cartridge independently by having separate isolated electrical current paths. In other implementations, the resistance of each active warming element could be varied by material differences and/or geometry differences to provide different amounts of Joule heating.

In some implementations, the consumable cartridges described herein can be contained within a wrapper or other container to isolate the consumable cartridge from external contaminants. In some instances, the wrapper or a portion thereof can include one or more conductive elements to electrically couple the one or more power source connectors of the consumable cartridge to a power source while the consumable cartridge remains within the wrapper or other container.

An implementation of a cartridge can comprise a housing defining a chamber storing a volume of reagent therein, an active warming element embedded within the housing and positioned proximate to the chamber, and a power source connector coupled to the housing and electrically coupled to the active warming element embedded within the housing. In some implementations, the active warming element can be to thaw the volume of reagent within the chamber responsive to providing electrical power to the power source connector.

The cartridge of the foregoing implementation can include that the housing defines one or more fins extending into the chamber. The cartridge of the foregoing implementations can include that at least a portion of the active warming element extends into the one or more fins. The cartridge of any of the foregoing implementations can include that the active warming element comprises conductive carbon embedded in the housing. The cartridge of any of the foregoing implementations can include that the active warming element comprises a resistive tape embedded in the housing. The cartridge of any of the foregoing implementations can include that the chamber is defined by a first sub-component and the housing comprises a plurality of sub-components that are separately constructed and coupled together. The cartridge of any of the foregoing implementations can include that the active warming element is coupled to an exterior surface of the first sub-component. The cartridge of any of the foregoing implementations can include that the power source connector comprises a conductive sticker having a conductive adhesive. The cartridge of any of the foregoing implementations can include that the power source connector comprises a portion of a top sealed to the housing. The cartridge of cl any of the foregoing implementations can include that the top comprises an aluminum foil. The cartridge of any of the foregoing implementations can further include an identifier coupled to the housing. The cartridge of any of the foregoing implementations can include that the identifier comprises an RFID transponder. The cartridge of any of the foregoing implementations can include that the identifier comprises a barcode.

An implementation of a method can comprise coupling a power source connector of a cartridge to a power source, and initiating an active heating process to thaw a reagent stored in a chamber of the cartridge, wherein the active heating process comprises applying power from the power source to an active warming element embedded in a housing of the cartridge proximate to the chamber storing the reagent for a predetermined period of time. The method of the foregoing implementation can include that the predetermined period of time is set responsive to accessing data of an identifier coupled to the housing of the cartridge. The method of any of the foregoing implementations can include that the identifier comprises an RFID transponder. The method of any of the foregoing implementations can include that the identifier comprises a barcode. The method of any of the foregoing implementations can include that the housing of the cartridge comprises a second active warming element proximate a second chamber storing a second reagent therein, the active heating process comprises applying a second power from the power source to the second active warming element for a second predetermined period of time, and the second predetermined period of time is different than the predetermined period of time. Any of the foregoing implementations of methods can be utilized with any of the foregoing cartridge implementations or the below cartridge implementations.

An implementation of a cartridge comprises a housing defining a first chamber storing a first volume of a first reagent therein and a second chamber storing a second volume of a second reagent therein, an active warming element embedded within the housing and positioned proximate to the first chamber and the second chamber, and a power source connector coupled to the housing and electrically coupled to the active warming element embedded within the housing. In some implementations, the active warming element is to thaw the first volume of the first reagent within the first chamber to a first target temperature and thaw the second volume of the second reagent within the second chamber to a second target temperature responsive to providing electrical power to the power source connector. The cartridge of the above implementation can further comprise an RFID transponder embedded in the housing, where the first target temperature and the second target temperature are determined responsive to accessing data of the RFID transponder.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A cartridge comprising:

frozen reagent;

a housing configured to be removably coupled to an instrument comprising electrical contacts without damaging the electrical contacts, the housing defining a chamber for storing a volume of the frozen reagent therein;

an active warming element embedded within a wall of the housing that defines the chamber; and a power source connector coupled to the housing and electrically coupled to the active warming element;

wherein the active warming element is configured to thaw the volume of the frozen reagent within the chamber responsive to providing electrical power to the power source connector.

2. The cartridge of claim 1, wherein the wall of the housing defines one or more fins extending into the chamber.

3. The cartridge of claim 2, wherein at least a portion of the active warming element extends into the one or more fins.

4. The cartridge of claim 1, wherein the active warming element comprises conductive carbon.

5. The cartridge of claim 1, wherein the active warming element comprises a resistive tape.

6. The cartridge of claim 1, wherein the chamber is defined by a first sub-component, wherein the housing comprises a plurality of sub-components that are separately constructed and coupled together.

7. The cartridge of claim 6, wherein the active warming element is coupled to an exterior surface of the first sub-component.

8. The cartridge of claim 1, wherein the power source connector comprises a conductive sticker having a conductive adhesive.

9. The cartridge of claim 1, wherein the power source connector comprises a portion of a top sealed to the housing.

10. The cartridge of claim 9, wherein the top comprises an aluminum foil.

11. The cartridge of claim 1, further comprising an identifier coupled to the housing.

12. The cartridge of claim 11, wherein the identifier comprises an RFID transponder.

13. The cartridge of claim 11, wherein the identifier comprises a barcode.

14. An apparatus comprising:

an instrument, comprising a cartridge chamber and electrical contacts; and a cartridge configured to be removably disposed at the cartridge chamber without damaging the electrical contacts, the cartridge, comprising:

frozen reagent;

a cartridge housing defining a reagent chamber for storing a volume of the frozen reagent therein; and an active warming element embedded within a wall of the housing that defines the reagent chamber, wherein the active warming element is configured to thaw the volume of the frozen reagent within the reagent chamber.

15. The apparatus of claim 14, wherein the cartridge further comprises a fluidic network.

16. The apparatus of claim 14, wherein the instrument comprises a detection assembly, wherein the detection assembly comprises imaging equipment for imaging a biological sample.

17. The apparatus of claim 16, wherein the instrument further comprises an analysis module that is configured to analyze imaging data to identify a sequence of nucleic acids of the biological sample.

* * * * *